Patented July 22, 1947

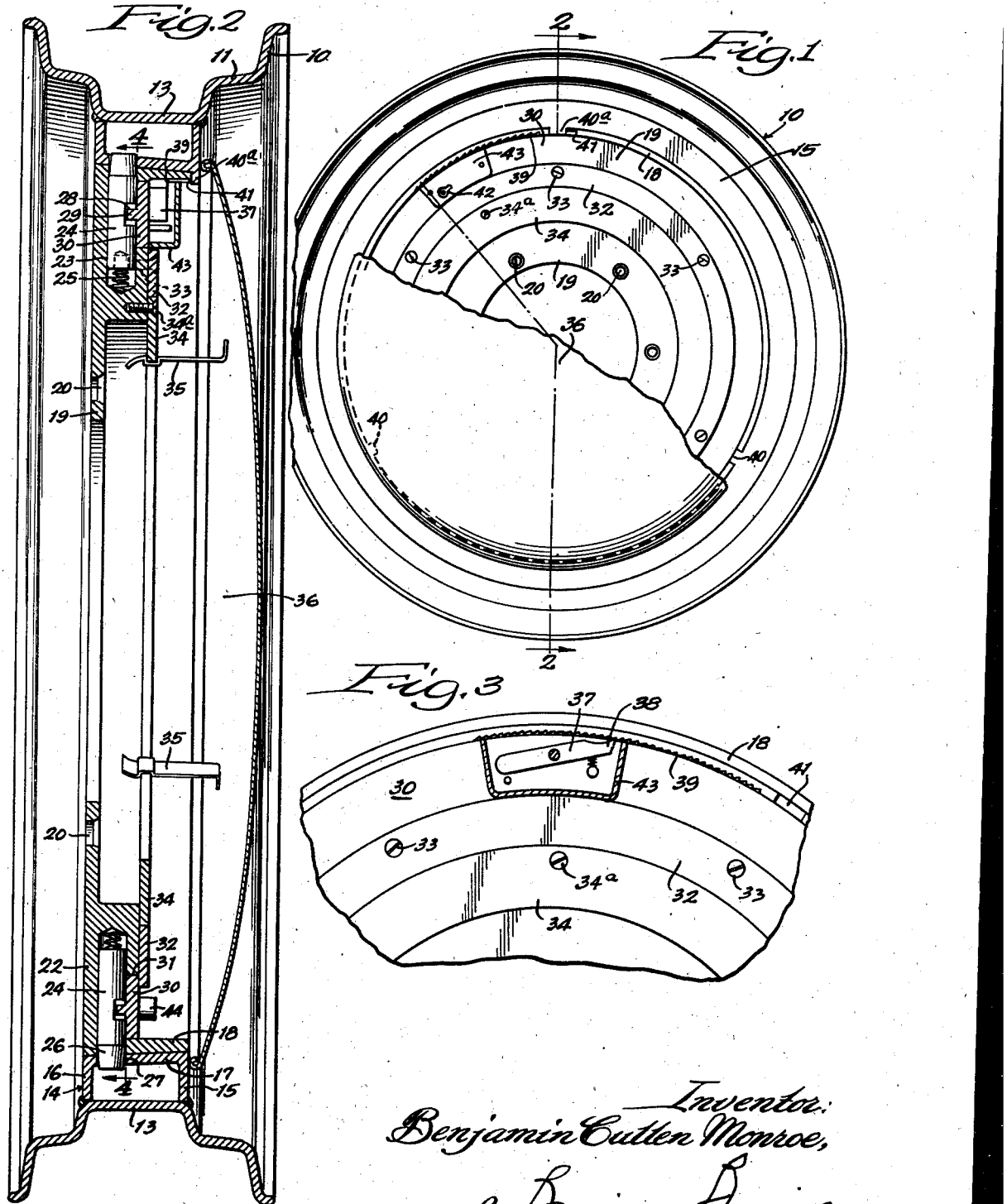

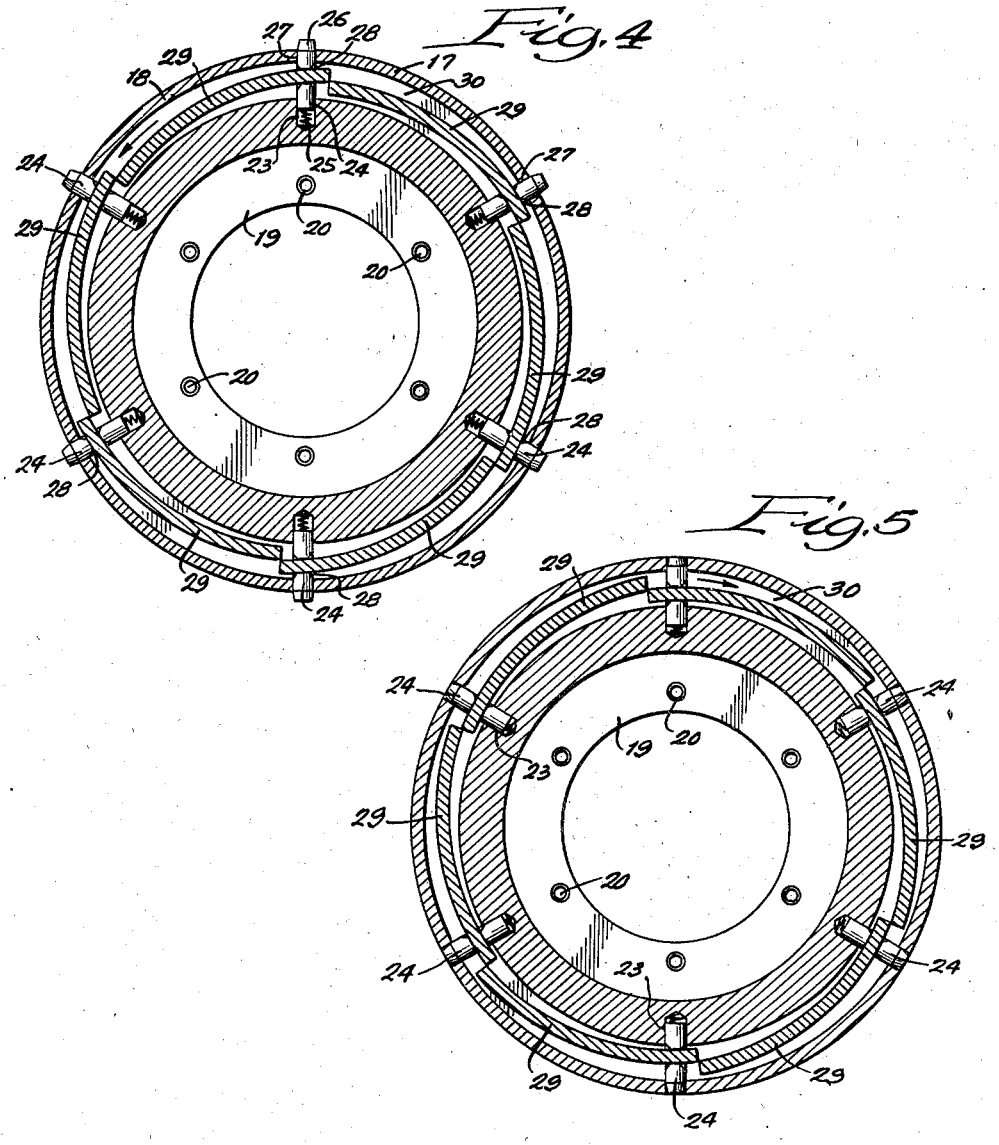

2,424,487

UNITED STATES PATENT OFFICE 2,424,487

DEMOUNTABLE WHEEL

Benjamin Cullen Monroe, Tuscola, Ill.

Application July 19, 1944, Serial No. 545,557

2 Claims. (Cl. 301—28)

The demountable wheel of the present invention is designed as an improvement on the wheel shown and described in my Patent No. 2,289,448, issued July 14, 1942. The present invention is directed to a wheel which is adapted to fit upon the hub structure and be locked in place thereon by the outward projection of a series of locking bolts all of which are adapted to be projected and retracted by the rotation of a cam ring which constitutes a portion of the hub structure. The features above described are found in the patent above referred to, but the present invention is directed more particularly to the provision of ratchet means for preventing the accidental reverse movement of the cam ring after the bolts have been thrown into engaging position with the further provision of a lock which permits disengagement of the ratchet elements when it is desired to retract the bolts for the purpose of removing the wheel. The present invention is also directed to the general structure of the device which permits convenient access to be had to the locking bolts in case they become wedged or "frozen" in position so that they cannot be readily retracted in the normal manner. The invention further relates to the provision of a hub cap of sufficient diameter to overlap the rim of the demountable wheel portion of the structure so that the working parts will be adequately protected against the ingress of dust or moisture and the invention finally consists in the general construction of the wheel and the component parts thereof.

In the drawings:

Fig. 1 is a side elevation of a wheel embodying the features of the present invention with the hub cap partially broken away to reveal the interior construction;

Fig. 2 is a large sectional elevation of the hub structure taken on line 2—2 of Fig. 1 with the rim of the demountable wheel portion;

Fig. 3 a detail of the ratchet and dog for preventing retraction of the bolts, and Figs. 4 and 5 two views of the locking dogs and cam ring with associated parts showing the locking bolts in projected and retracted positions respectively.

The structure as a whole comprises a demountable wheel portion 10 having a channel-shaped rim 11 adapted to receive a tire (not shown), these portions being of conventional formation. The base 13 of the rim has welded thereto an inwardly projecting channel-shaped ring 14 comprising outer and inner side walls or flanges 15 and 16 and a connecting base wall 17, the outer side wall being of greater width than the inner side wall so that the base wall 17 will extend obliquely to afford a beveled or wedging surface for contact with the outer wall or periphery 18 of a hub plate 19 provided with screw holes 20 adapting the hub plate to be secured to a hub, not shown, of any suitable construction. The hub plate around its marginal portion 22 is outwardly offset or thickened to provide a plurality of bolt sockets 23 each of which receives a locking bolt 24 backed by a coil spring 25. The outer ends 26 of the bolts are beveled to afford an easy entrance into coacting bolt holes 27 in the base 17 of the ring 14 which latter constitutes a part of the rim.

Each of the bolts on its outer face is provided with a notch 28 which is adapted to coact with convolute cam ribs 29 on the inner face of a cam ring 30, which ring overlies and protects the bolts and is itself rotatable within a socket, afforded in part by a shoulder 31 formed in the outer face of the hub plate, and in part by a guide ring 32 which projects beyond the shoulder and overlies the inner edge of the cam ring. The guide ring is secured to the thickened margin of the hub plate by screws 33 and the ring encircles and abuts against an inner ring 34 secured by screws 34a which project inwardly to expose its edge which affords engagement for a plurality of spring clips 35 which project inwardly from a hub cap 36 which permit the hub cap to be snapped into position in a manner well understood in the art.

The hub cap is preferably of sufficiently great diameter to bring its outer edge into contacting relation with the side wall 15 of the channelled rim ring 14 so that the joint afforded between the rim ring and the beveled margin of the hub plate will be concealed and protected as well as the remaining portions of the hub structure as previously described. The convolute cam ribs are arranged in circularly stepped relation as shown in Figs. 4 and 5, so that a turning of the ring in the clockwise direction will retract the bolts while a turning of the ring in the anticlockwise direction will project the bolts into bolt holes 27 in the base of the rim ring 14.

In order to prevent accidental retraction of the bolts by a turning of the cam ring, the cam ring is provided with a spring pressed dog 37 provided with a tooth 38 adapted to engage with a row of ratchet teeth 39 which present their abrupt faces to the left in Fig. 3 or in position to oppose the rotation of the cam plate 30 toward the right. In the throwing of the bolts by a rotation of the cam ring to the left, the dog tooth will ride over the ratchet teeth until the bolts have been projected outwardly to their fullest extent and thereafter a reverse movement will be prevented. Furthermore, the forward rotation of the hub will be in a direction tending to tighten the cam ring against the bolts, but when the car is being backed or suddenly brought to a stop while moving forwardly, the dog and ratchet combination will prevent any tendency for the cam ring to be reversed with a resultant retraction of the bolts. The ends of the bolts are beveled so that they will set easily and tightly within the apertures in the rim ring, and in order to insure a proper assembling of the parts, a plurality of lugs 40 are provided which extend inwardly from the rim ring and engage with the recesses 41 in the margin 18 of the hub plate, one of the lugs 40a however, being of larger size with a corresponding enlargement in the coacting recess so that a proper centering of the parts will be insured to secure proper balance when the demountable wheel portion is fitted on to the hub.

In order to permit the demountable wheel portion to be removed from the tub, a lock 42 (Fig. 1) of any suitable description is provided in the wall of a housing 43 which encloses the dog, so that when occasion requires, the dog can be retracted by a turning of the lock key which thereupon permits the cam ring to be rotated in the proper direction to retract the bolts and permit the wheel portion to be removed. In order to facilitate the rotation of the cam ring, the latter is provided with one or more outwardly projecting lugs 44 which permit the ring to be turned either directly by hand or by the impact of a suitable tool. By providing a lock for the dog, theft will be prevented, since even the removal of the plate 32 would not ordinarily permit the cam ring to be rotated and the bolts to be retracted as long as the dog engages the ratchet teeth.

At the same time the provision of the lock affords a ready means for permitting adjustment of the cam ring by authorized persons and the quick removal of the wheel which will be relatively light in weight due to the fact that the removable portion includes only the tire and rim with the rim ring which latter can be formed of stamped metal of relatively light weight so that the manipulation of the wheel can be easily accomplished.

I claim:

1. A demountable wheel including a wheel rim, a channel shaped ring fitted within the rim and comprising inner and outer side walls secured to the rim at opposite sides of the bottom of the channel thereof and a connecting base wall, the outer side wall being of greater radial dimension than the inner side wall, a hub plate provided with an annular wall having a wedging contact with the connecting base wall of said channel shaped ring, said hub plate having a marginal thickened portion provided with radial bolt sockets and having an annular recess, locking bolts operable in the sockets and engaging the base wall of the channel shaped ring, an annular cam seated in said annular recess and operatively connected with said bolts for actuating the same, a hub cap provided with clips, and annular means secured to said hub plate and confining the cam in said recess and engaged by the clips of said hub cap.

2. A demountable wheel including a wheel rim, a channel shaped ring fitted within the rim and comprising inner and outer side walls secured to the rim at opposite sides of the bottom of the channel thereof and a connecting base wall, the outer side wall being of greater radial dimension than the inner side wall, a hub plate provided with an annular wall having a wedging contact with the connecting base wall of said channel shaped ring, said hub plate having a marginal thickened portion provided with radial bolt sockets and having an annular recess, locking bolts operable in the sockets and engaging the base wall of the channel shaped ring, an annular cam seated in said annular recess and operatively connected with said bolts for actuating the same, a hub cap provided with clips, and a pair of inner and outer contiguous concentric rings secured to said hub plate, the outer ring confining the cam in said recess and the inner ring being engaged by the clips of the hub cap.

BENJAMIN CULLEN MONROE.

REFERENCES CITED

The following references are of record in the file of this patent:

UNITED STATES PATENTS

| Number | Name | Date |
|---|---|---|
| 2,244,083 | Richter | June 3, 1941 |
| 2,289,448 | Monroe | July 14, 1942 |
| 1,456,451 | Krpata | May 22, 1923 |
| 1,707,458 | Clench | Apr. 2, 1929 |

FOREIGN PATENTS

| Number | Country | Date |
|---|---|---|
| 22,635 | Great Britain | 1913 |